United States Patent [19]
Mitani et al.

[11] Patent Number: 5,581,407
[45] Date of Patent: Dec. 3, 1996

[54] PERMEABLE SCREEN AND ITS MANUFACTURING METHOD

[75] Inventors: Katsuaki Mitani, Ibaraki; Satoshi Aoki, Kadoma; Hitoshi Mukai, Takatsuki, all of Japan

[73] Assignee: Matsushita Electric Industrial Co., Ltd., Osaka, Japan

[21] Appl. No.: 214,816

[22] Filed: Mar. 16, 1994

[30] Foreign Application Priority Data

Mar. 19, 1993 [JP] Japan ................................. 5-059879

[51] Int. Cl.⁶ ......................................... G03B 21/56
[52] U.S. Cl. .................. 359/619; 359/456; 359/457; 359/460
[58] Field of Search ............................ 359/619, 455, 359/456, 457, 460

[56] References Cited

U.S. PATENT DOCUMENTS

| | | | |
|---|---|---|---|
| 4,730,897 | 3/1988 | McKechnie et al. | 359/457 |
| 5,066,099 | 11/1991 | Yoshida et al. | 359/457 |
| 5,400,114 | 3/1995 | Yoshida et al. | 359/457 |

FOREIGN PATENT DOCUMENTS

| | | | |
|---|---|---|---|
| 0469313 | 5/1992 | European Pat. Off. | |
| 58-147727 | 9/1983 | Japan | 359/457 |
| 59-3425 | 1/1984 | Japan | 359/457 |
| 63-142712 | 9/1988 | Japan | |
| 5-188477 | 7/1993 | Japan | |
| 5-203804 | 8/1993 | Japan | |

*Primary Examiner*—David C. Nelms
*Assistant Examiner*—Vu A. Le
*Attorney, Agent, or Firm*—Ratner & Prestia

[57] ABSTRACT

A permeable screen possesses superior brightness, high contrast, wide view angle, excellent contrast to external light, superior clearness, and less reflection of external light image. The permeable screen includes a front dispersing panel and a lenticular lens sheet disposed at the incident side of the front dispersing panel and forming plural lens surfaces. The permeable screen also includes a Fresnel lens sheet disposed at the incident side of the lenticular lens sheet and forming plural lens surfaces. The front dispersing panel functions as a screen and also provides mechanical strength. The front dispersing panel also possesses parts for mounting and fixing the lenticular lens sheet and Fresnel lens sheet.

19 Claims, 6 Drawing Sheets

PERMEABLE SCREEN AND ITS MANUFACTURING METHOD

BACKGROUND OF THE INVENTION

The present invention relates to a permeable screen for use in a projection type television receiver and a manufacturing method thereof.

Figure 9:
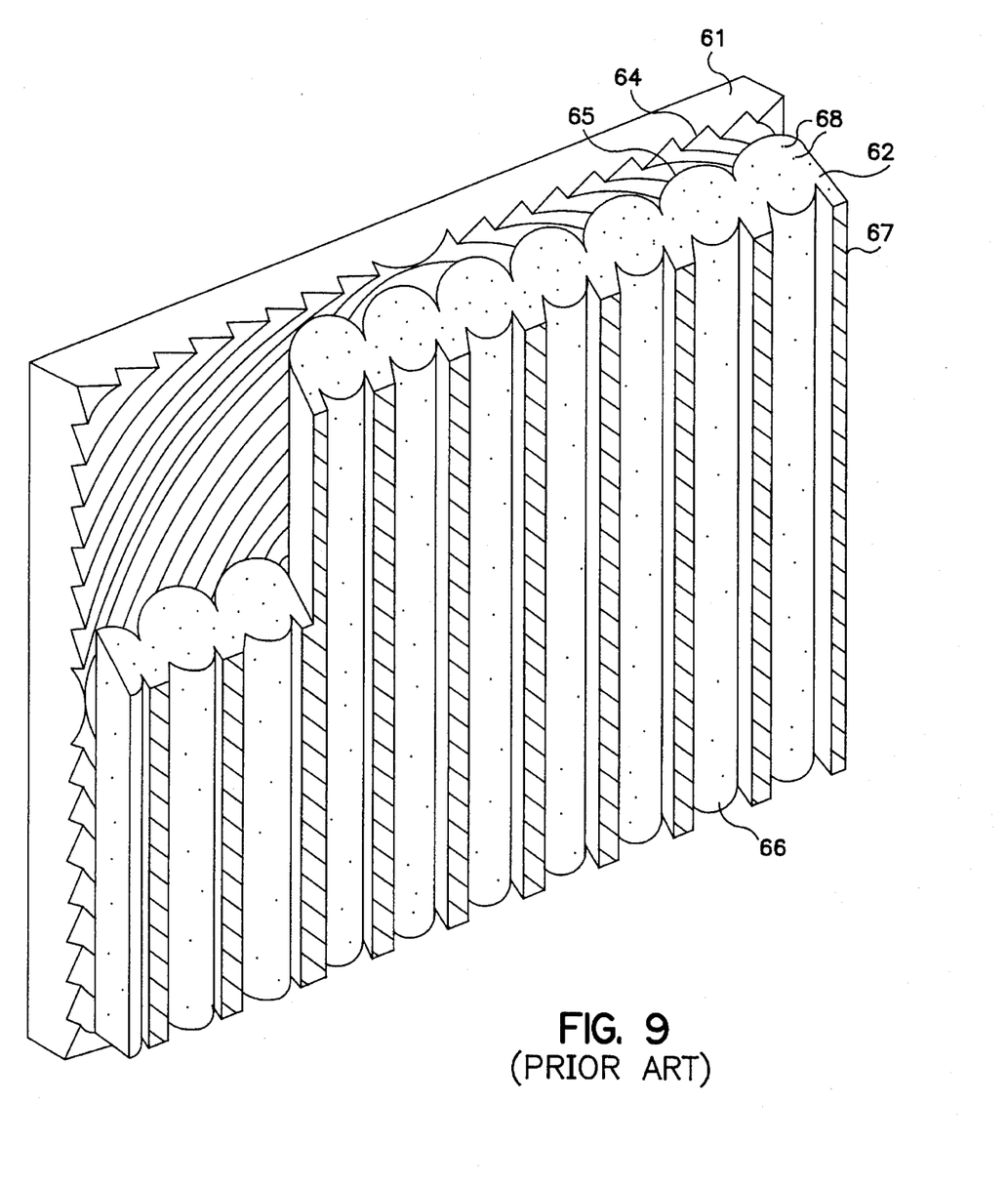
FIG. 9 is a schematic view showing an example of a conventional permeable screen.
Figure 10:
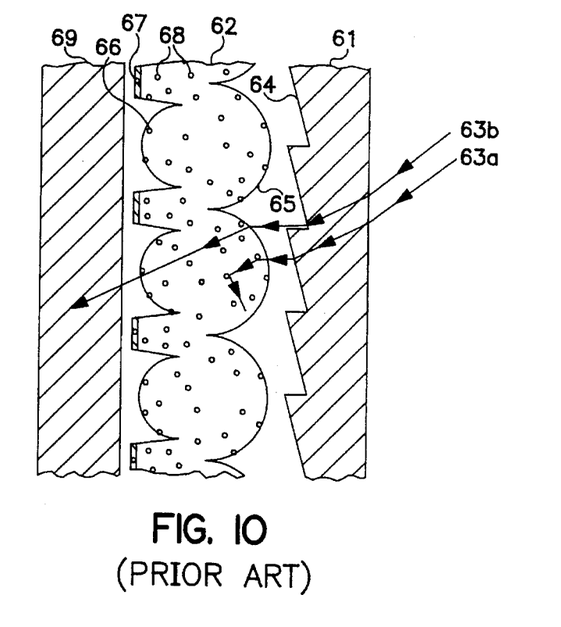
FIG. 10 is a schematic view showing an example of a conventional permeable screen.

An example of a conventional permeable screen is shown in FIGS. 9 and 10.

As shown in FIG. 9, the conventional permeable screen is two-sheets comprising a Fresnel lens sheet 61 having a Fresnel lens 64, and a lenticular lens sheet 62 overlaid on the front side of the Fresnel lens sheet 61.

In the lenticular lens sheet 62, in order to enhance matching of the picture and expand the vertical view field, light dispersing fine particles, such as glass and high molecular material which function as dispersing agent 68, are mixed in a screen substrate.

On both sides of the lenticular lens sheet 62, cylindrical lenticular lenses 65, 66 are formed.

Furthermore, to prevent reduction in contrast due to external light, protruding black stripes indicated by external light absorption layer 67 are formed in specific pitch stripes in the non-focusing area of the incident side of the lenticular lens 65.

However, as shown in FIG. 10, for the conventional construction, part of the incident light becomes stray light as indicated by incident ray 63a in FIG. 10. This occurs because the dispersing agent 68 is mixed in the lenticular lens sheet 62.

As a result, various problems such as deterioration of resolution, worsening of color performance due to color shift or color shading, and lowering of brightness due to loss of quantity of exit light may be caused.

Moreover, part of the dispersing agent projects on the surface of the cylindrical lenticular lens 65 of the lenticular lens sheet 62 or the protruding black stripes 67 in the non-focusing area, and therefore, the surface of the lenticular lens sheet 62 is undulated.

Accordingly, when the side surface of the lenticular lens sheet 62 where light exits is exposed to external light, irregular reflection occurs, and the screen surface becomes whitish. As a consequence, the contrast is lowered.

To improve the lowering in brightness and lowering in contrast due to external light, as shown in FIG. 10, a method is proposed of disposing a glass or plastic transparent panel 69 for lowering the light permeability on the front surface of the screen.

In this case, however, undesired external light images from fluorescent lamps, room light, surrounding people, windows and other objects are often reflected on the transparent panel 69, which makes it difficult to observe the screen.

Figure 11:
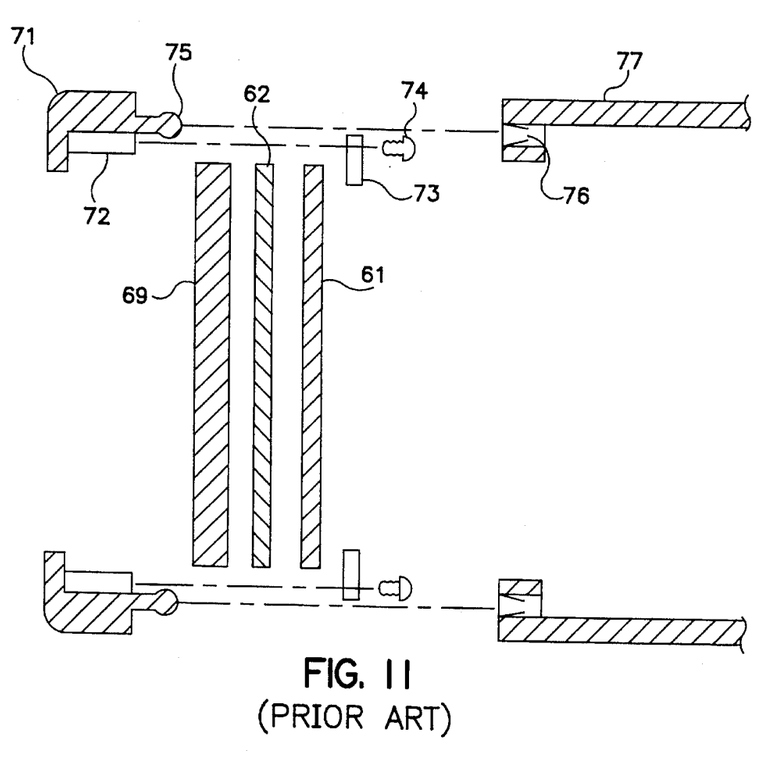
FIG. 11 is a sectional view showing the structure and assembly of a conventional permeable screen cabinet.

A conventional permeable screen cabinet including the conventional permeable screen is shown in FIG. 11.

As shown in FIG. 11, to mount the conventional permeable screen on a television receiver cabinet main body 77, the transparent panel 69, lenticular lens sheet 62 and Fresnel lens sheet 61 must be affixed to a mounting boss 72 on which a mounting frame 71 is formed, by tightening with a mounting bracket 73 and setscrews 74.

As a result, mounting parts for mounting the screen are required, the number of parts are numerous and the mounting processes is long, thereby causing raised costs.

SUMMARY OF THE INVENTION

The present invention relates to a permeable screen featuring excellent resolution, excellent color performance, superior brightness, high contrast, wide view field, excellent contrast to external light, excellent clearness, and lowered reflections of external light images.

The present invention further relates to a permeable screen cabinet possessing both an excellent screen function and cabinet structure.

The present invention also relates to a manufacturing method of a permeable screen cabinet having a reduced number of parts, simple manufacturing process, and reduced cost.

The present invention further relates to a permeable screen comprising:

a front dispersing panel functioning as a screen, a lenticular lens sheet disposed at the incident side of the front dispersing panel and forming a lens surface, and a Fresnel lens sheet disposed at the incident side of the lenticular lens sheet and forming a lens surface.

The present invention also relates to a permeable screen cabinet comprising:

a permeable screen possessing a front dispersing panel functioning as a screen, a lenticular lens sheet disposed at the incident side of the front dispersing panel and forming a lens surface, and a Fresnel lens sheet disposed at the incident side of the lenticular lens sheet and forming a lens surface; and a projection type television receiver cabinet, where the permeable screen is installed in the cabinet.

The present invention further relates to a manufacturing method for a permeable screen comprising:

a step of forming a front dispersing panel which is comprised of a dispersing agent and a base material, a step of forming a lenticular lens sheet possessing a lens surface, a step of forming a Fresnel lens sheet possessing a lens surface, and a step of combining the lenticular lens sheet and the Fresnel lens sheet sequentially behind the front dispersing panel.

The present invention further relates to a manufacturing method of permeable screen cabinet comprising:

a step of assembling a permeable screen by installing a lenticular lens sheet and a Fresnel lens sheet inside a front dispersing panel having a box-shape where the permeable screen functions as a screen, and a step of fitting and assembling a projection type television receiver cabinet and the front dispersing panel.

The front dispersing panel is, for example, composed of a base material and a dispersing agent dispersed and contained in the base material.

The front dispersing panel may, for example, be formed in two layers by laminating a transparent layer and a dispersing layer containing a dispersing agent in the base material.

The front dispersing panel may be formed of a base material and a dispersing agent adhered and contained on the surface of the base material.

The base material of the dispersing panel is, for example, a transparent or translucent resin. However, the base material is not limited to these materials. For example, acrylic resin, polycarbonate resin, styrene-acrylic copolymer resin and similar compounds are preferred.

The thickness of the dispersing panel is not particularly limited, however, a thickness in a range of 1 to 5 mm is preferred. This dispersing panel also functions as a structural reinforcing member.

Further, the material of the dispersing agent is not limited, however, fine particles of an inorganic compound, organic compound, glass, ceramics, and plastics, for example, may be used.

For example, beads made from acrylic resin, styrene resin, their respective crosslinked compounds, glass and other materials are preferred.

Also, the particle size for the dispersing agent is not particularly limited, however, particle sizes of 50 μm or less are preferred, and more preferably are particle sizes 10 μm or less. The thickness of the dispersing layer is not particularly limited, however, a thickness of 0.2 mm or less is preferred.

The material of the transparent layer is not limited, however, for example, a transparent or translucent resin may be used. For example, an acrylic resin and polycarbonate resin are preferred. The thickness of the transparent layer is not particularly limited, but the preferred thickness is 1 to 4 mm.

The lenticular lens sheet has a plurality of lens surfaces in a specific shape for the purpose of enhancing the horizontal view angle, color shift and color shading.

The thickness of the lenticular lens is not limited, however, for example, the thickness is preferred to be between 1.2 to 1.4 times the pitch of the lenses formed in the lenticular lens sheet.

It is also possible to form an external absorption layer for the purpose of improving the contrast in external light for a specified area of the exit side of the lenticular lens sheet.

The construction of the external absorption layer is not limited, however, black stripes may be formed by occupying 30 to 50% of the area, in the area, for example, not forming the lens surfaces.

The black stripes are preferred to be a black dye or pigment.

The Fresnel lens sheet forms plural lens surfaces in a specific shape for converting the received light rays from a cathode-ray tube into parallel rays of light received by the lenticular lens.

The materials for the Fresnel lens, however, for example, sheet are not limited. For example, a transparent or translucent resin may be used.

Acrylic resin, polycarbonate resin, and polyester resin are preferred.

The size of the permeable screen is not limited, however, the size may be defined, for example, in a lateral width of 600 to 2000 mm and a vertical width of 300 to 1500 mm, depending on the particular application.

The front dispersing panel focuses a picture using the fine dispersing particles. The dispensing panel also keeps a wide view angle and conceals the external absorption layer formed on the surface of the lenticular lens sheet from the viewer. As a result, pictures having high resolution can be produced.

The dispersing agent should not be contained in the lenticular lens sheet so that, stray light is not generated in the lenticular lens sheet. Thus, a bright screen with improved color shift and color shading, excellent color characteristic and resolution, and reduced loss in the quantity of exit light is produced.

In the lenticular lens sheet, however, a small amount of dispersing agent may be mixed in the lenticular lens , and as a result specific functions such as horizontal view angle, color shift and color shading may be realized.

Furthermore, it is possible to produce the lenticular lens continuously using one die. In addition, changing screen specifications, such as gain, vertical view angle and contrast, can be realized by altering the front dispersing panel. Thus, manufacturing costs of the lenticular lens may be lowered.

The gain and view angle can be adjusted by controlling the content of the dispersing agent contained in the front dispersing panel.

To raise the gain and lower the vertical view angle, the content of the dispersing agent in the dispersing layer is decreased. In contrast, by increasing the content of the dispersing agent in the dispersing layer, a lower gain and a higher vertical view angle can be obtained.

It is also possible to prevent undesired external light images of lights, windows, objects and surrounding people from being reflected by forming a fine rough surface on the exit side surface of the disposing panel.

The surface roughness of the fine rough surface is not limited, however, a proper roughness is such that an adverse effect on the picture does not occur.

It is further possible to include a black material having uniform absorption in the visible wavelength region or a visible ray absorbing material having selective wavelength absorbing characteristic, in at least one of the front dispersing panel, lenticular lens sheet or Fresnel lens sheet.

Contrast may be improved using this construction since the light absorption rate in the visible ray wavelength region can be increased to absorb external light.

The black material having a uniform absorption spectrum in the visible wavelength region is not limited, however. For example, black pigment and dye can be used.

The visible ray absorbing material having selective wavelength characteristic is not limited, however. Dye, pigment, carbon powder, metal powder, organic metal salt and others compounds may be used.

Furthermore, the absorption spectrum of the visible ray absorbing material does not necessarily have to be flat The material may have varying wavelength characteristics, depending on the strength ratio of the three-color CRT used in the projection type television receiver. The characteristics are varied to enhance color purity, etc.

It is also possible to form a reflection preventive film in at least one of the surface of the front dispersing panel, the surface of the lenticular lens sheet, and the surface of the Fresnel lens sheet.

By using the reflection preventive film, the reflectivity caused by external light is lowered and the permeability of projected light is raised, and thus, a bright picture is obtained, so that a picture of high resolution, reflection of external light, high contrast, and high clearness may be obtained.

Figure 5:
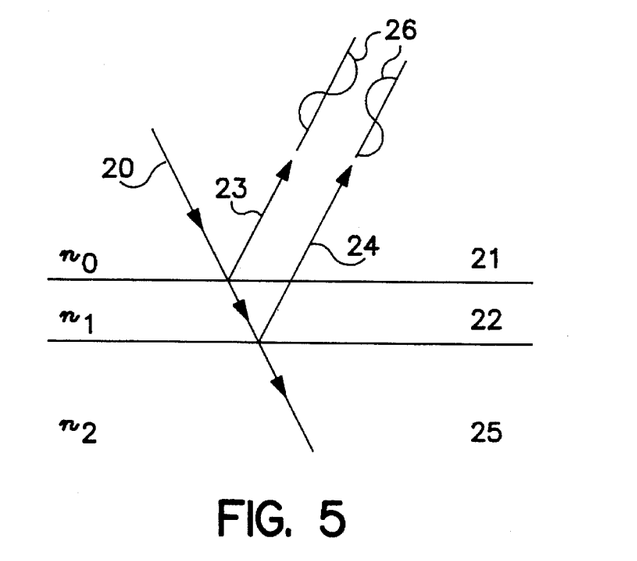
FIG. 5 is a diagram showing the theoretical basis for prevention of reflection relating to reflection preventive film constituted in accordance with the exemplary embodiments of the present invention.

It is desired that the reflection preventive film may be, for example, a material having a lower refractive index than the refractive index of each base material. This is because the basic principle of the reflection preventive film is, as shown in FIG. 5, based on the interference effect of mutual cancellation of reflected lights from upper surface reflected light 23 and lower surface reflected light 24 of a thin film 22.

The refractive index of a substrate is defined to be $n_2$, the refractive index of the thin film 22 to be $n_1$, and the refractive index of an incident side medium 21 (air in most cases) to be $n_0$.

To cancel each other out, the two reflected luminous fluxes 26 from the upper reflected light 23 and lower reflected light 24 of the thin film 22 may be equal in intensity.

Accordingly, the refractive index of each boundary surface is equal.

The relation between $n_2$ and $n_1$ is defined as $n_0/n_1 = n_1/n_2$, $n_1 = (n_0 \times n_2)^{1/2}$, From $n_0/n_1 = n_1/n_2$, $n_1 = (n_0 \times n_2)^{1/2}$, the refractive index of the reflection preventive film may be an intermediate value between air which is usually regarded to have a refractive index of 1 and refractivity of the substrate which is the value of the square root of the refractive index of the substrate.

Since part of the incident light 20 is reflected by the upper surface and lower surface of the reflective preventive film, both reflections occur within the medium having a lower refractive index than the adjacent medium.

Therefore, to achieve the interference effect of mutual cancellation of the two reflected luminous fluxes, a relative phase shift should be adjusted to 180°.

When the total phase difference between two luminous fluxes corresponds to two times ¼ wavelength, that is, 180 degrees, the film thickness (d) of which optical thin film is ¼ wavelength should be set to $d = (\lambda \times 1)/(4 \times n_1)$, where $\lambda$ is wavelength.

Hence, a simple reflection preventive film has a refractive index equal to the square root of the refractive index of the substrate, and is a single-layer film having value equal to ¼ of the wavelength of the light where the optical thin film is used.

Among the thin film materials, the transparent fluororesin is close to the calculated value. Its refractive index is generally 1.32 to 1.35.

A stable reflective preventive film may be easily manufactured by, for example, coating, a solution containing fluororesin. SITOP, a tradename of Asahi Glass Co., for example, is such a fluororesin.

By controlling the concentration of SITOP and pulling-up speed from the coating tank, thin films with film thickness of scores of micrometers to scores of nanometers may be easily obtained.

For example, where a thickness of 0.1 μm of acrylic resin is used as screen base material and reflection preventive film, the reflectivity is lowered from about 4% of the acrylic resin to about 1.2% after forming the thin film.

The front dispersing panel may be formed in a solid structure having a box shape which has an open side.

The Fresnel lens sheet and lenticular lens sheet may be installed in the open side on the inner plane of the front dispersing panel, and the front dispersing panel may be directly installed on the cabinet main body of the projection type television receiver, thereby functioning as a structural body.

A fitting part is formed on the end surface of the front dispersing panel, and a fitting part is formed on the cabinet main body of the projection type television receiver, so that the front dispersing panel may be coupled to the cabinet main body.

Accordingly, parts for mounting and fixing are not needed, and the number of assembling steps is decreased, so that the cost of manufacturing may be reduced significantly.

Also according to the exemplary embodiment of the present invention, it is possible to obtain a permeable screen cabinet possessing both excellent screen function and cabinet structure.

Further, a smaller number of parts, a simple in manufacturing process, and low cost can be realized.

According to an exemplary embodiment of the present invention, it is not necessary to prepare various screens for every different specification for projection type television receivers. Also the investment for a die is small, the productivity is raised, and the cost is lowered for producing the screens.

Furthermore, the screen specification can be changed easily and freely, so that it is possible to quickly adjust with market changes.

| [Reference Numerals] | |
| --- | --- |
| 1 | Permeable screen |
| 2 | Front dispersing panel |
| 3 | Lenticular lens sheet |
| 4 | Incident side lenticular lens |
| 5 | Exit side lenticular lens |
| 6 | Fresnel lens |
| 7 | Fresnel lens sheet |
| 8 | Transparent layer |
| 9 | Thin dispersing layer |
| 10 | Dispersing agent |
| 11a | Incident ray a |
| 11b | Incident ray b |
| 12 | Cabinet main body |
| 13 | Mounting holder convex part |
| 14 | Mounting holder concave part |
| 15 | Screen contact fixing part |
| 16 | External absorption layer |

-continued

| [Reference Numerals] | |
|---|---|
| 17 | Surface dispersing layer |
| 18 | Dispersing layer |
| 19 | Reflection preventive film |
| 20 | Incident light |
| 21 | Incident side medium (air) |
| 22 | Thin film |
| 23 | Upper reflected light of thin film |
| 24 | Lower reflected light of thin film |
| 25 | Substrate |
| 26 | Intensity of reflected luminous flux |
| 27 | Reflectivity of acrylic resin |
| 28 | Reflectivity after SITOP coating |
| 29 | Screen contact fixing part |
| 61 | Fresnel lens sheet |
| 62 | Lenticular lens sheet |
| 63a | Incident ray a |
| 63b | Incident ray b |
| 64 | Fresnel lens |
| 65 | Incident side lenticular lens |
| 66 | Exit side lenticular lens |
| 67 | External light absorption layer |
| 68 | Dispersive agent |
| 69 | Transparent panel |
| 71 | Mounting frame |
| 72 | Mounting boss |
| 73 | Mounting bracket |
| 74 | Setscrew |
| 75 | Holder convex part |
| 76 | Holder concave part |
| 77 | Cabinet main body |

DESCRIPTION OF THE PREFERRED EMBODIMENTS

Example 1

A first exemplary embodiment of the present invention is described below while referring to FIGS. 1, 2, 3, 7, and 8.

Figure 1:
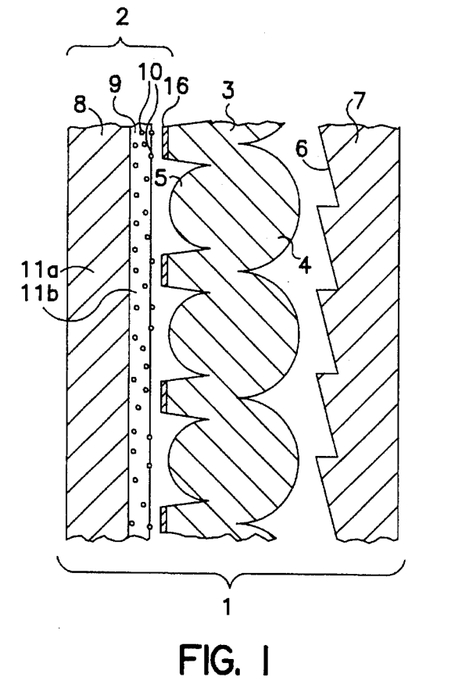
FIG. 1 is a schematic view showing a permeable screen according to an exemplary embodiment of the present invention.
Figure 2:
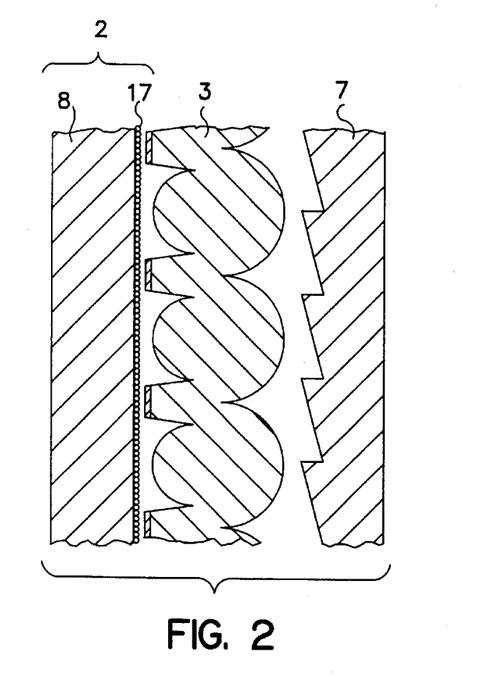
FIG. 2 is a schematic view showing the permeable screen according to another exemplary embodiment of the present invention.
Figure 3:
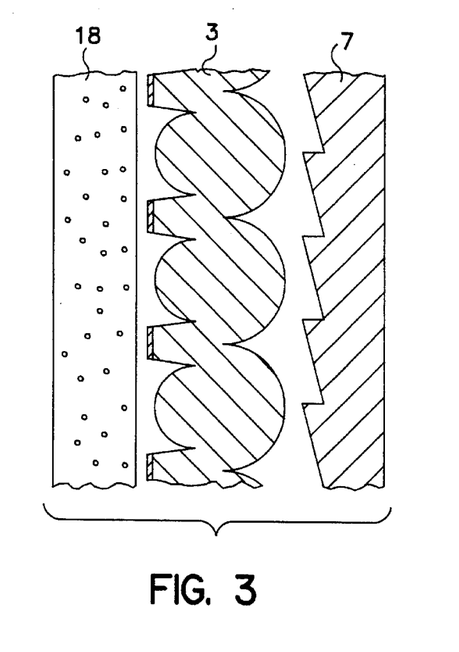
FIG. 3 is a schematic showing another permeable screen according to another exemplary embodiment of the present invention.

FIGS. 1, 2 and 3 are magnified schematic views showing the principal parts of a permeable screen.

Figure 7A:
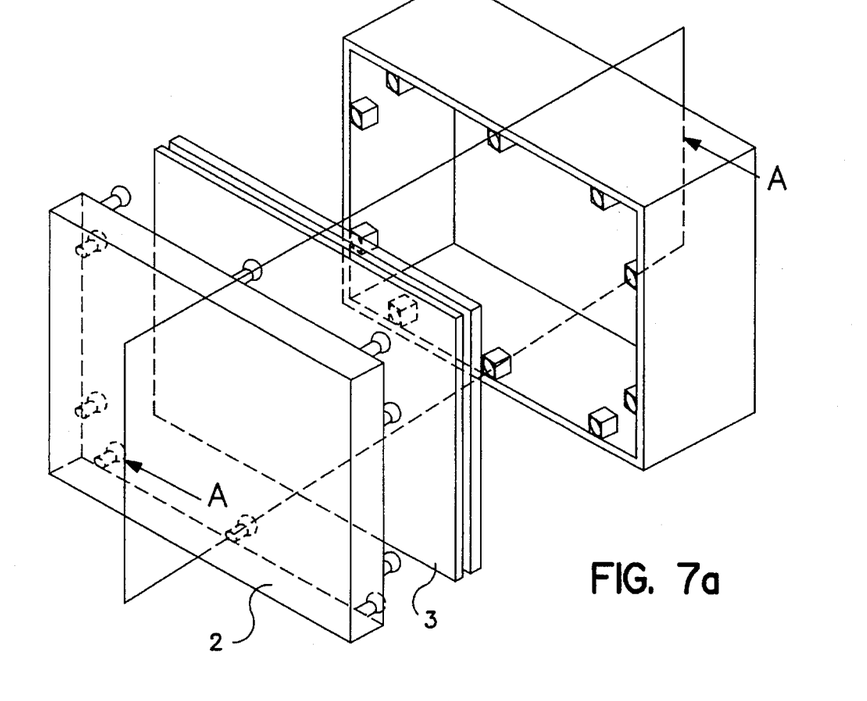
FIG. 7A is a solid view showing the structure and assembly of the permeable screen cabinet according to an exemplary embodiment of the present invention.
Figure 7B:
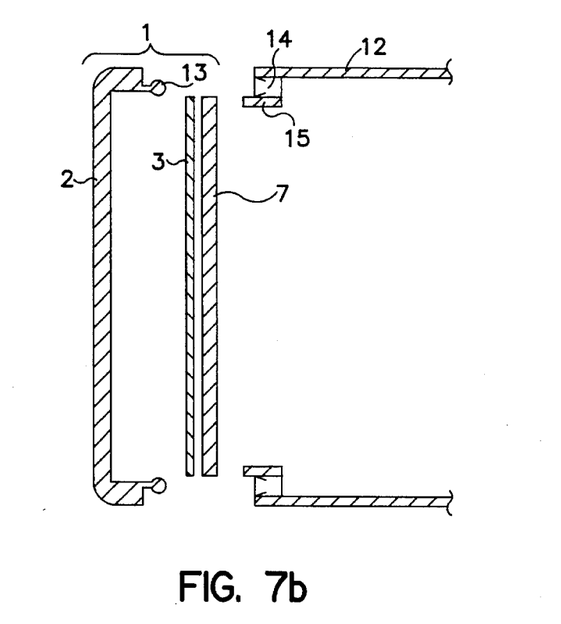
FIG. 7B is a sectional view along side A in FIG. 7A.
Figure 8A:
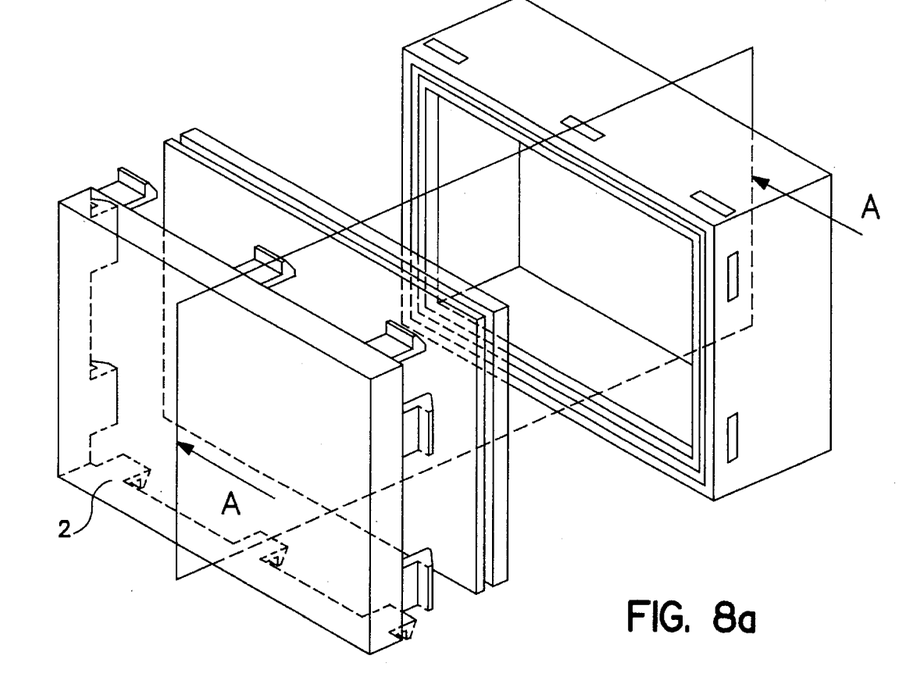
FIG. 8A is a solid view showing the structure and assembly of the permeable screen cabinet according to another exemplary embodiment of the present invention.
Figure 8B:
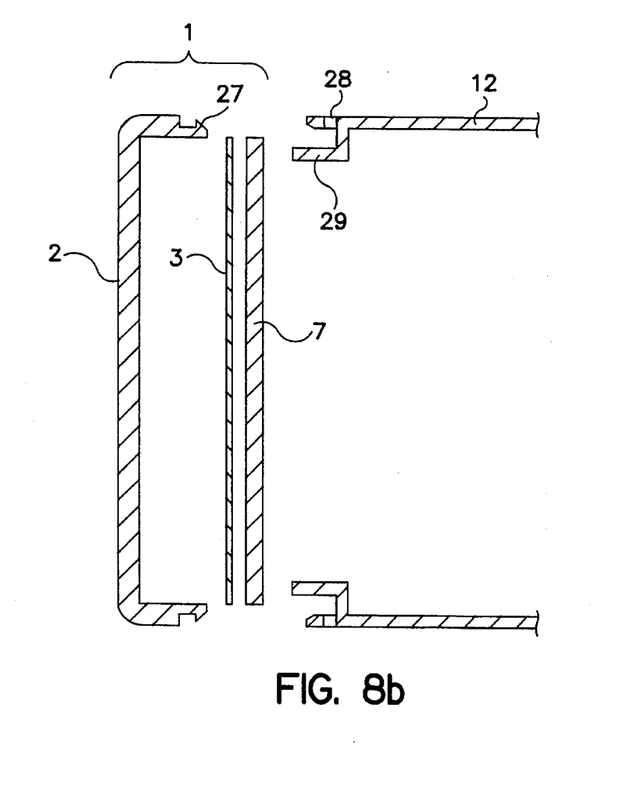
FIG. 8B is a sectional view along side A in FIG. 8A.

FIGS. 7 and 8 are assembly and cut-away schematic views showing the principal parts of a permeable screen cabinet.

In FIG. 1, a permeable screen 1 has a three-piece construction comprising a front dispersing panel 2 shaped in the form of a box, a lenticular lens sheet 3 forming lenticular lenses 4, 5 located next to the inner plane surface of the front dispersing panel 2, and a Fresnel lens sheet 7 forming a Fresnel lens 6 located at the incident light side of the lenticular lens sheet 3.

In FIGS. 7A–7B, the front dispersing panel 2 of the permeable screen 1 is shaped as a box capable of receiving and fitting lenticular lens sheet 3 and Fresnel lens sheet 7 in tight contact with an inner plane of the dispersing panel 2. A mounting holder convex part 13 for mounting and fixing to a cabinet main body 12 is provided at the edge of front dispersing panel 2.

A mounting holder concave part 14 of a screen contact fixing part 14 is formed on the end surface of the cabinet main body 12 of the projection type television receiver. The lenticular lens sheet 3 and Fresnel lens sheet 7 are tightly fixed to the inner plane of the front dispersing panel 2 by fixing the mounting holder convex part to the mounting holder concave part.

The front dispersing panel 2 may also be constructed as shown in FIG. 8. A mounting claw 27 is disposed on the front dispersing panel 2, and fitted into a mounting hole 28 formed in the cabinet main body 12, thereby tightly fixing the lenticular lens sheet 3 and Fresnel lens sheet 7 to the inner plane of the front dispersing panel 2.

Using this construction, the mounting claw 27 formed in the front dispersing panel 2 and the mounting hole formed in the cabinet main body 12 are directly fitted together.

In FIG. 1, the front dispersing panel 2 has a two-layer structure comprising a thin dispersing layer 9 having a dispersing agent 10. Then dispersing layer 9 is located at the incident side of the front dispersing panel 2. A transparent layer 8 is also provided on the surface closest to the viewer.

Thus, the front dispersing panel 2 has a structure possessing functions necessary for screen performance such as gain and view angle.

An external absorption layer 16 is formed as black stripes on a specified area of the surface of the light exit side of lenticular lens sheet 3.

The thin dispersing layer 9 of the front dispersing panel 2 is effective for concealing the vertical streak lines of lenticular lens 5 of lenticular lens sheet 3 and external absorption layer 16 from the viewer. Furthermore, transparent layer 8 is effective for producing a picture with sharp clear feeling.

In addition, by adding a tinting agent in either one of the thin dispersing layer 9 or the transparent layer 8, or in the dispersing agent 10, the contrast in external light for the screen may be enhanced.

To prevent external light images from being reflected, the principal plane closest to the viewer of the dispersing panel has a fine coarse surface.

The lenticular lens sheet 3 is composed of a transparent resin material not containing a dispersing agent, or containing a very small amount of dispersing agent.

The lenticular lens sheet 3 comprises a lenticular lens 4 formed on the incidence light side of lenticular lens 4, a lenticular lens 5 is formed on the exit light side of the lenticular lens 4. Black stripes 16 or an external absorption layer are formed at equal pitch in the non-focusing area of the lenticular lens 5 on the exit light side of the lenticular lens sheet 3.

As shown in FIGS. 9 and 10 relating to the prior art, if the dispersing agent 68 is dispersed in the entire region of the lenticular lens sheet 62, not only transmitted light such as incident ray 63b, but also stray light such as incident ray 63a may be intensified, and the light utility rate may be reduced to 70%, resulting in a large loss of the quantity of light.

In this exemplary embodiment of the present invention, the transparent layer 8 is formed in the lenticular lens sheet 2 as mentioned above.

Therefore, as shown in FIG. 1, the incident rays 11a and 11b are 100% transmitted light, and the loss in the quantity of light does not occur.

The incident rays 11a and 11b are focused and dispersed by the dispersing agent 10 of the thin dispersing layer 9 of the front dispersing panel 2. By defining the thin dispersing layer 9 to a thickness of 0.6 mm or less, the incident ray does not hit against plural dispersing agents, and thus, the majority of incident rays will be transmitted light, so that the loss in the quantity of light may be decreased.

The preferred thickness of the dispersing layer 9 is 0.2 mm or less.

In another exemplary embodiment, as shown in FIG. 2, the front dispersing panel 2 may be composed of a transparent base material layer 8, and a surface dispersing layer 17 having a dispersing agent adhered to the surface of the base material layer 8.

The front dispersing panel 2 may be a single-layer structure, instead of two-layer structure, comprising a dispersing layer 18 having a dispersing agent dispersed and contained in the base material as shown in FIG. 3.

By using the thin dispersing layer 9, surface dispersing layer 17 or dispersing layer 18, the vertical streak lines of the lenticular lenses and black stripes are not visible by the viewer. As a result the viewer perceives that the resolution is enhanced even at close proximity.

The wall thickness, x, of the front dispersing panel 2 is 2 mm.

The thickness of the front dispersing panel 2 is set at this thickness because it plays a role in reinforcing the thin lenticular lens sheet and Fresnel lens sheet.

The maximum thickness of the lenticular lens sheet, according to the exemplary embodiment is 1.3 mm.

The maximum thickness of the Fresnel lens sheet according to the exemplary embodiment is 1.5 mm.

The lenticular lens sheet 3 may be manufactured from a transparent resin without including a dispersing agent. It is also possible to manufacture lenticular lens sheet 3 by including a very small amount of dispersing agent so as not to cause stray light.

In this exemplary embodiment, the same effects can be obtained by using a very small amount of dispersing agent in lenticular lens sheet 3 so as not to cause stray light and loss in the quantity of light when combined with the front dispersing cabinet 2.

The front dispersing panel 2 can be manufactured in a two-layer structure comprising two materials. One material for the transparent layer (for example, acrylic resin, polycarbonate resin, styrene-acrylic copolymer resin, other transparent resin) and a second material for the dispersing layer. The layers can be formed by an injection molding method or an injection compressive molding method.

In another manufacturing method for the front dispersing panel 2, a resin material containing dispersing agent or a transparent resin material is injected on a transparent film placed in a die or on a film containing a dispersing agent. Then the material is solidified and formed in a two-layer structure.

In another manufacturing method for the front dispersing panel 2, a plastic film containing a dispersing agent and a substrate are laminated and adhered together using an adhesive.

In an alternative manufacturing method for the front dispersing panel 2, a plastic film containing a dispersing agent and a substrate are laminated and fixed together by heating and pressing.

In another manufacturing method for the front dispersing panel 2, a plastic film containing a dispersing agent and a substrate are laminated and fixed together by heating and pressing.

In a different manufacturing method for the front dispersing panel 2, a mixed solution containing dispersing agent, resin and solvent is applied on a surface of a substrate. Then the solvent is removed, thus, forming the front dispersing panel 2.

In another manufacturing method for the front dispersing panel 2, a mixed solution containing dispersing agent and solvent is applied on the surface of a substrate. Then the solvent is removed.

In another manufacturing method for the front dispersing panel 2, a resin material containing a dispersing agent is used and formed into the front dispersing panel 2 by injection forming, compressive forming, injection compressive forming, or hot press forming techniques.

In a different manufacturing method for the front dispersing panel 2, a resin material containing a dispersing agent is poured into a die, and then solidified to form a two-layer structure.

In another manufacturing method for the front dispersing panel 2, a dispersing agent is applied on the inner surface of a transparent panel using a transparent or translucent resin which is formed by surface treatment such as printing, hot stamping, roll coating, and painting, thereby depositing a surface dispersing layer.

A thin film containing a dispersing agent may be inserted between the inner surface of the front dispersing panel and the lenticular lens sheet.

Example 2

A second exemplary embodiment of the present invention is described below with reference to FIG. 1.

In the second exemplary embodiment of the present invention, a black material having light absorption characteristics where the absorption spectrum is almost uniform in the visible wavelength region is contained in transparent layer 8 of the front dispersing cabinet 2.

Contrast in external light is enhanced because the light absorbing material absorbs external light. By varying the content of the visible ray absorbing material, the contrast in external light can be adjusted, so that the brightness and contrast in external light can be freely controlled.

For example, when black dye is used as the visible light absorbing material at a quantity of 30%, the contrast in external light is enhanced by 30%, while the brightness is lowered by 30%.

By varying the content of the visible light absorbing material, considering the particular environment, an appropriate picture considering both brightness and contrast in external light can be freely obtained.

In this exemplary embodiment, the visible ray absorbing material, aside from the transparent layer 8, may be disposed in one or a combination of the dispersing agent 10, thin dispersing layer 9, lenticular lens sheet 2, and Fresnel lens sheet 1. The same improvements can be achieved.

Example 3

A third exemplary embodiment of the present invention is described with reference to FIGS. 4 and 6.

Figure 4:
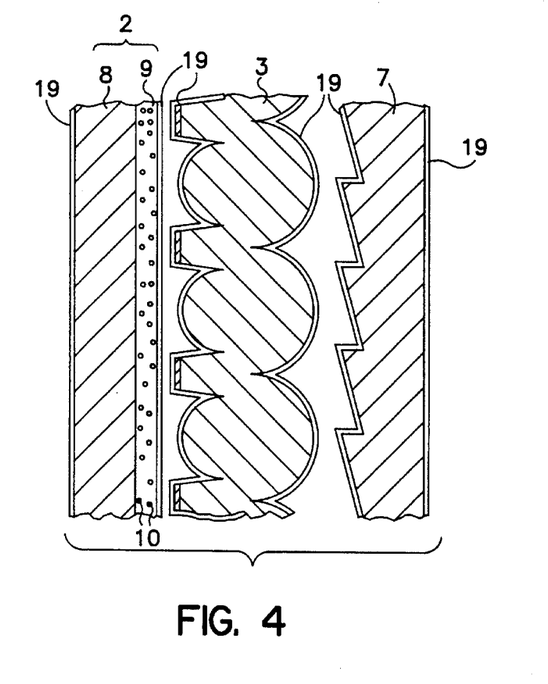
FIG. 4 is a schematic view showing a different permeable screen according to another exemplary embodiment of the present invention.

FIG. 4 is a schematic view of a permeable screen in the third exemplary embodiment of the present invention. In FIG. 4 a reflection preventive thin film 19 is formed on all of the surfaces of the front dispersing panel 2 having a thin dispersing layer 9, transparent layer 8, lenticular lens sheet 3 and Fresnel lens sheet 7.

The reflection preventive film 19 is composed of a material mainly comprising fluororesin. This reflection preventive film 19 is formed by dipping a base material in a transparent fluororesin solution, for example, SITOP from Asahi Glass, and by removing the base material from the solution at a specific rate to form a uniform thin film.

The thickness of the reflection preventive film was calculated according to the formula, $(d)=(\lambda \times 1)/(4 \times n^1)$, so that reflection may be maintained at a minimum in the middle (k=550 nm) of the visible light region $(0.55/(4 \times 1.34)=$ 0.103). Accordingly, the film thickness of the reflection preventive film, SITOP, applied was 0.1μ.

Figure 6:
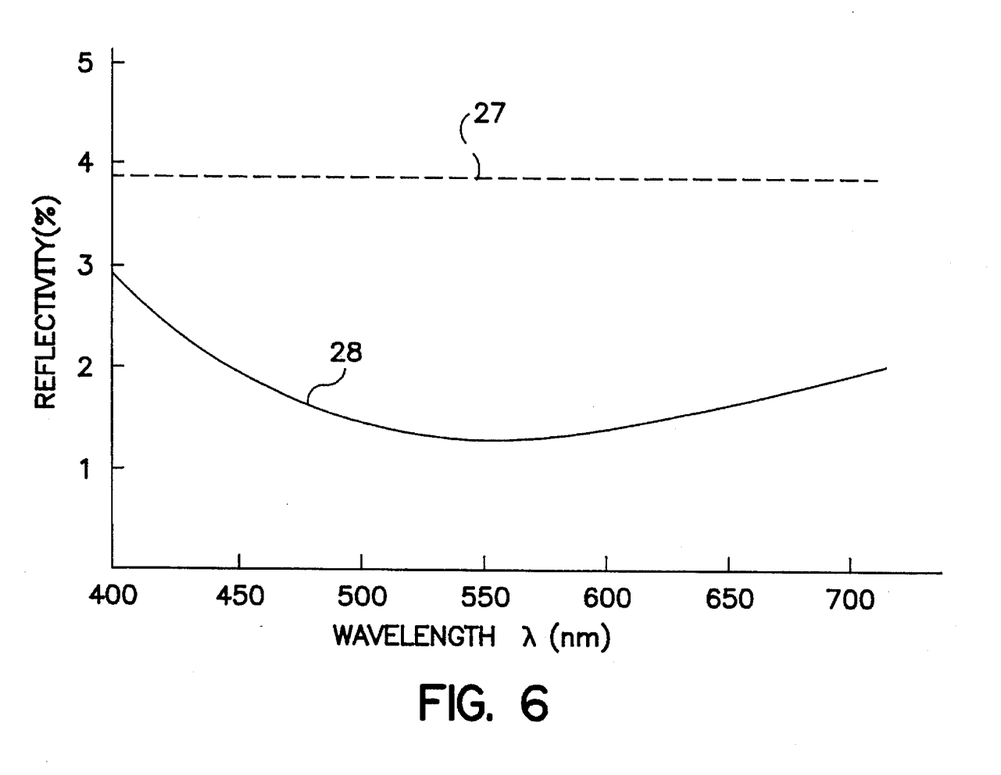
FIG. 6 is a diagram showing the measured reflectivity of the reflection preventive film coating according to an exemplary embodiment of the present invention.

As a result, as shown in FIG. 6, the reflectivity after applying a coating of SITOP is represented by curve 28, as compared with the reflectivity of the acrylic resin before coating indicated by curve 27.

The screen coated with the reflection preventive film was installed in a projection type television receiver, and a screen cabinet as shown in FIGS. 7A-7B was fabricated. When the projection type television receiver is compared with the performance before coating with reflection preventive film, the improvement in contrast in external light was 15% or more at an external light illumination of 360 lux on the screen surface. The gain was also improved by 10%. In addition, a picture with less reflection in external light was obtained.

In addition to the foregoing exemplary embodiments, various modifications are possible as a matter of course. For example, in addition to the front dispersing panel has improved dispersing performance, it is also possible to place a dispersing agent in the lenticular lens sheet or Fresnel lens sheet.

In addition to the front dispersing panel having improved dispersing performance, materials having other properties such as antistatic and contamination prevention may also be added to the dispersing panel.

The external light absorbing layer formed on the lenticular lens sheet may be either spot shape or lattice formed, using other light absorbing material, aside from black stripes.

In addition to the front dispersing panel possessing a reflection preventive film, a reflection preventive thin film may be formed on the principal plane of either lenticular lens sheet or Fresnel lens sheet.

A reflection preventive thin film may also be formed on the principal plane of only the front dispersing panel.

Furthermore, the front dispersing panel may also be formed having a protruding part so that the lenticular lens sheet and Fresnel lens sheet may be fixed inside.

Moreover, an auxiliary fixing tool for tightening and fixing the front dispersing panel including the lenticular lens sheet and Fresnel lens sheet to the television receiver cabinet may be provided.

Although illustrated and described herein with reference to certain specific embodiments, the present invention is nevertheless not intended to be limited to the details shown. Rather, various modification may be made in the details within the scope and range of equivalents of the claims and without departing from the spirit of the invention.

What is claimed:

1. A permeable screen comprising:
   a front dispersing panel having a first incident light side, wherein the front dispersing panel has a box-shape, and includes means for installing and fixing a lenticular lens sheet and a Fresnel lens sheet inside the front dispersing panel,
   the lenticular lens sheet disposed at the first incident light side of the front dispersing panel, said lenticular lens sheet forming a lens surface and having a second incident light side, and
   the Fresnel lens sheet disposed at the second incident light side of the lenticular lens sheet and forming a lens surface.

2. The permeable screen of claim 1, wherein the front dispersing panel comprises a base material and a dispersing agent contained in the base material.

3. The permeable screen of claim 1, wherein the front dispersing panel is composed of a base material and a dispersing agent applied on a surface of the base material.

4. The permeable screen of claim 1, wherein at least one of a (a) black material having a uniform absorption spectrum in the visible wavelength region and (b) a visible light absorbing material having selective wavelength absorbing characteristics is contained in at least one of the front dispersing panel, the lenticular lens sheet and the Fresnel lens sheet.

5. The permeable screen of claim 1, further comprising a reflection preventive film formed in at least one of a surface of the front dispersing panel, a surface of the lenticular lens sheet, and a surface of the Fresnel lens sheet.

6. The permeable screen of claim 5, wherein the reflection preventive film is a fluororesin having a smaller refractive index than the refractive index of the front dispersing panel, the lenticular lens sheet and the Fresnel lens sheet.

7. The permeable screen of claim 1, wherein the front dispersing panel has a light exit surface which is at least one of a flat surface and a fine coarse surface.

8. The permeable screen of claim 1, further comprising one of (i) a dispersing agent formed on a surface of the lenticular lens sheet and (ii) a dispersing agent contained in the lenticular lens sheet.

9. The permeable screen of claim 1, further comprising an external light absorbing layer formed on a specified-area of a light exit side surface of the lenticular lens sheet.

10. A permeable screen comprising:
    a front dispersing panel laminate comprising a transparent layer and a dispersing layer, said front dispersing panel laminate having a first incident light side,
    a lenticular lens sheet disposed at the incident light side of the front dispersing panel laminate, said lenticular lens sheet having a second incident light side and forming a lens surface, and
    a Fresnel lens sheet disposed at the second incident light side of the lenticular lens sheet and forming a lens surface.

11. The permeable screen of claim 10, wherein the dispersing layer is composed of a base material and a dispersing agent contained in the base material.

12. A permeable screen of claim 10, wherein at least one of (a) a black material having a uniform absorption spectrum in the visible wavelength region and (b) a visible light absorbing material having selective wavelength absorbing characteristics is contained in at least one of the transparent layer and the dispersing layer of the front dispersing panel laminate.

13. A permeable screen cabinet comprising:
    a cabinet of a projection type television receiver,
    a permeable screen installed in the cabinet comprising
    a front dispersing panel, wherein the front dispersing panel has a box-shape which is installed and fixed to the cabinet, and wherein a lenticular lens sheet and a Fresnel lens sheet are installed inside the box-shaped front dispersing panel,
    the lenticular lens sheet disposed behind the front dispersing panel, and
    the Fresnel lens sheet disposed behind the lenticular lens sheet.

14. A permeable screen cabinet of claim 13, further comprising first fitting means formed at a first end surface of the box-shaped front dispersing panel incorporating the lenticular lens sheet and the Fresnel lens sheet, and second fitting means formed at a second end surface of the cabinet, where the dispersing panel and the cabinet are fixed together by the first fitting means and the second fitting means respectfully.

15. The permeable screen cabinet of claim 14, wherein one of the first fitting means and second fitting means is convex and the other is concave.

16. A permeable screen comprising:
   a from dispersing panel having a box-shape which has a light exit side which is a flat surface, said front dispersing panel having a first incident light side,
   a lenticular lens sheet disposed at the first incident light side inside the front dispersing panel, said lenticular lens sheet having plural lens surfaces and external light absorbing layers and a second incident light side, and
   a Fresnel lens sheet disposed at the second incident light side of the lenticular lens sheet, said Fresnel lens sheet having plural lens surfaces.

17. The permeable screen of claim 16, wherein the front dispersing panel is composed of a dispersing layer containing a dispersing agent disposed at the light incident side, and a transparent layer disposed at the light exit side.

18. The permeable screen of claim 16, further comprising a reflection preventive film formed in at least one of a surface of the front dispersing panel, a surface of the lenticular lens sheet, and a surface of the Fresnel lens sheet.

19. The permeable screen of claim 16, wherein the front dispersing panel possesses means for setting and fixing the lenticular lens sheet and the Fresnel lens sheet inside the front dispersing panel, and means for fitting and fixing the front dispersing panel to a cabinet main body of a television receiver.

* * * * *